United States Patent
Steckman et al.

(10) Patent No.: US 7,359,046 B1
(45) Date of Patent: Apr. 15, 2008

(54) METHOD AND APPARATUS FOR WAFER-LEVEL MEASUREMENT OF VOLUME HOLOGRAPHIC GRATINGS

(75) Inventors: Gregory J. Steckman, Glendora, CA (US); Frank Havermeyer, Arcadia, CA (US); Lawrence Pokwah Ho, Arcadia, CA (US)

(73) Assignee: Ondax, Inc., Monrovia, CA (US)

( * ) Notice: Subject to any disclaimer, the term of this patent is extended or adjusted under 35 U.S.C. 154(b) by 76 days.

(21) Appl. No.: 11/402,357

(22) Filed: Apr. 12, 2006

Related U.S. Application Data

(60) Provisional application No. 60/670,737, filed on Apr. 12, 2005.

(51) Int. Cl.
*G01N 21/00* (2006.01)
(52) U.S. Cl. .................. 356/239.1; 356/239.2
(58) Field of Classification Search ............... None
See application file for complete search history.

(56) References Cited

U.S. PATENT DOCUMENTS

| | | | |
|---|---|---|---|
| 5,491,570 A | | 2/1996 | Rakuljic et al. |
| 5,625,453 A | * | 4/1997 | Matsumoto et al. ........ 356/488 |
| 5,691,989 A | | 11/1997 | Rakuljic et al. |
| 6,606,152 B2 | * | 8/2003 | Littau et al. ................ 356/124 |
| 6,829,067 B2 | | 12/2004 | Psaltis et al. |
| 2003/0128370 A1 | * | 7/2003 | De Lega ..................... 356/521 |

OTHER PUBLICATIONS

Joseph W. Goodman, Introduction to Fourier Optics, 1968, pp. 198-224.
Herwig Kogelnik, Coupled Wave Theory for Thick Hologram Gratings, The Bell System Tech. Journal, Nov. 1969, vol. 48, No. 9, pp. 2909-2947.
Frank Havermeyer et al., Volume Holographic Grating-Based Continuously Tunable Optical Filter, Opt. Eng. 43(9), Sep. 2004, pp. 2017-2021.
Gregory J. Steckman et al., Storage Density of Shift-Multiplexed Holographic Memory, Applied Optics, Jul. 10, 2001, vol. 40, No. 20, pp. 3387-3394.
Gregory J. Steckman et al., Holographic Multiplexing in Photorefractive Polymers, Optics Communications, Nov. 1, 2000, 185, pp. 13-17.
Michael Levene et al., Method for Controlling the Shift Invariance of Optical Correlators, Applied Optics, Jan. 10, 1999, vol. 38, No. 2, pp. 394-398.
Jaime Frejlich et al., Analysis of an Active Stabilization System for a Holographic Setup, Applied Optics, May 15, 1988, vol. 27, No. 10, pp. 1967-1976.
Paulo Santos et al., Interference-term Real-time Measurement for Self-stabilized Two-wave Mixing in Photorefractive Crystals, Optics Letters, Nov. 1988, vol. 13, No. 11, pp. 1014-1016.
Warren Smith, Modern Optical Engineering, 1990, pp. 43-47.

\* cited by examiner

*Primary Examiner*—Micahel P. Stafira

(57) ABSTRACT

The invention describes a system for the measurement of volume holograms on a wafer scale that permits high-resolution and high throughput measurement of grating parameters. The invention uses a collimated beam of a fixed wavelength light source that is transmitted through the wafer to be tested. The transmitted beam is imaged with a lens onto a sensor. The sensor is used to measure the beam power under a variety of conditions, including without a wafer in place, so that the various measurements can be used to determine grating characteristics. The measurement data produced includes values for grating spacing, tilt angle, and diffraction efficiency with a high spatial resolution.

17 Claims, 6 Drawing Sheets

METHOD AND APPARATUS FOR WAFER-LEVEL MEASUREMENT OF VOLUME HOLOGRAPHIC GRATINGS

RELATED APPLICATION

This patent application claims priority to provisional patent application 60/670,737 filed on Apr. 12, 2005 and incorporated by reference herein in its entirety.

BACKGROUND OF THE INVENTION

1. Field of the Invention

The invention relates to methods and apparatus for the measurement of volume holographic gratings.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Holography is the process of recording phase information into a material that is sensitive to the intensity of the incident illumination ("Introduction to Fourier Optics", J. W. Goodman, McGraw-Hill, 1968). Early holographic recording materials were primarily photographic films, but modern photorefractive materials additionally include dichromated gelatin films, $LiNbO_3$ and other crystals, polymers, and glasses. Amplitude and phase information can be recorded through the interference of mutually coherent signal and reference beams.

When the signal and reference beams are simple plane waves, the material records the single sinusoidal intensity pattern formed by their interference. The grating is referred to by its grating vector, which has a grating magnitude and orientation. The magnitude is the refractive index modulation depth for materials that contain phase gratings, and is the absorption modulation for materials that contain amplitude gratings. The orientation is determined by the angle between the recording beams and the recording material. If the signal or reference beam, or both, are not simple plane waves but rather carry information in the form of phase or intensity variations, then the recorded hologram can be thought of as being composed of many superimposed individual gratings each recorded by pairs of plane waves from the Fourier decomposition of the recording beams. A description of this process is found in the reference by J. W. Goodman noted above.

Holographic recording can be used with thin or thick media. When the material in which the hologram is present is thick, then Bragg selectivity occurs ("Coupled Wave Theory for Thick Hologram Gratings", H. Kogelnik, The Bell System Tech. J. 48:9, 1969). Volume hologram reflection gratings have been shown to be an extremely accurate and temperature-stable means of filtering a narrow passband of light from a broadband spectrum. This technology has been demonstrated in practical applications where narrow full-width-at-half-maximum (FWHM) passbands are required. Furthermore, such filters have arbitrarily selectable wavefront curvatures, center wavelengths, and output beam directions.

Photorefractive materials, such as $LiNbO_3$ crystals and certain types of polymers and glasses, have been shown to be effective media for storing volume holographic gratings. Uses include optical filters or holographic optical memories with high diffraction efficiency and storage density (F. Havermeyer, W. Liu, C. Moser, D. Psaltis, G. J. Steckman, Volume Holographic Grating-Based Continuously Tunable Optical Filter, Optical Engineering 43(0), September 2004) (G. J. Steckman, A. Pu, and D. Psaltis, Storage Density Of Shift-Multiplexed Holographic Memory, Applied Optics 40 (20): 3387-3394 Jul. 10, 2001) (G. J. Steckman, R. Bittner, K. Meerholz, and D. Psaltis, Holographic Multiplexing In Photorefractive Polymers, Optics Communications 185(1-3): 13-17 Nov. 1, 2000) (G. J. Steckman, I. Solomatine, G. Zhou, and D. Psaltis, Holographic Data Storage In Phenanthrenequinone Doped PMMA, SPIE Photonics West, San Jose, Calif., Jan. 27, 1999) (M. Levene, G. J. Steckman, and D. Psaltis, Method For Controlling The Shift Invariance Of Optical Correlators, Applied Optics 38 (2): 394-398 Jan. 10, 1999) (U.S. Pat. No. 6,829,067). In addition, volume gratings Bragg-matched to reflect at normal incidence have been used successfully to stabilize and lock the wavelength of semiconductor laser diodes (U.S. Pat. No. 5,691,989).

FIG. 1 illustrates a non-slanted volume holographic grating 100 readout at an angle $\theta$ with readout beam 105. When the Bragg condition, $\lambda_r=2n(\lambda_r)\Lambda \cos(\theta_r)$, is satisfied the grating will diffract the incident beam into the output beam 110 where $\lambda_r$ is the readout wavelength in vacuum, $n(\lambda_r)$ is the refractive index of the volume holographic grating element material at the readout wavelength, $\Lambda$ is the grating spacing, and $\theta$ is the readout angle of incidence inside the material. The paper by H. Kogelnik describes volume holographic grating diffraction. For a simple uniform grating, the characteristics are determined by the thickness of the volume element, the refractive index modulation depth, the grating spacing, and the slant angle relative to the surface normal.

For mass production of volume holographic grating elements it is desirable to measure these characteristics at the wafer level before dicing into final parts of smaller size. Prior art measurement systems use a single readout laser beam that is detected by a single element, thereby integrating the performance over the area illuminated by the beam. The spatial resolution and area of test coverage is limited by the beam diameter. Increasing the area of coverage is possible by scanning a small beam over the area of a larger wafer, however this is a time consuming process, particularly if a high resolution, and therefore a small diameter readout beam, is required.

SUMMARY OF THE INVENTION

The invention describes a system for the measurement of volume holograms on a wafer scale that permits high-resolution and high throughput measurement of grating parameters. The invention uses a collimated beam of a fixed wavelength light source that is transmitted through the wafer to be tested. The transmitted beam is imaged with a lens onto a sensor. The sensor is used to measure the beam power under a variety of conditions, including without a wafer in place, so that the various measurements can be used to determine grating characteristics. The measurement data produced includes values for grating spacing, tilt angle, and diffraction efficiency with a high spatial resolution.

BRIEF DESCRIPTION OF THE DRAWINGS

These and other features, aspects and advantages of the invention will become better understood with regard to the following description, appended claims and accompanying drawings where:

DETAILED DESCRIPTION OF THE INVENTION

In the following description of the invention, reference is made to the accompanying drawings which form a part hereof, and in which is shown by way of illustration a specific embodiment in which the invention may be practiced. It is to be understood that other embodiments may be utilized and structural changes may be made without departing from the scope of the invention.

Figure 1:
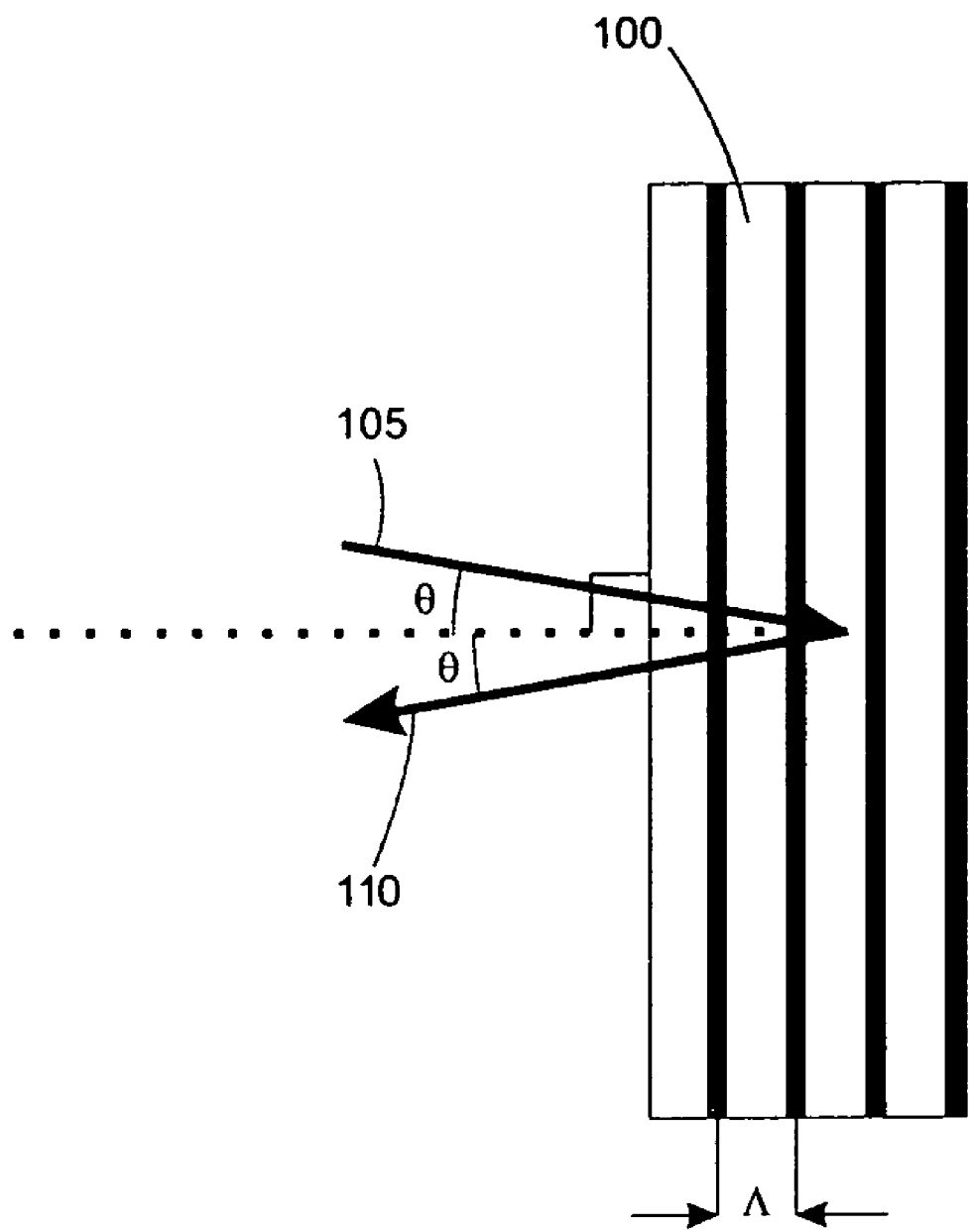
FIG. 1 (prior art) shows the diffraction of an incident beam by a reflection geometry volume holographic grating.
Figure 2:
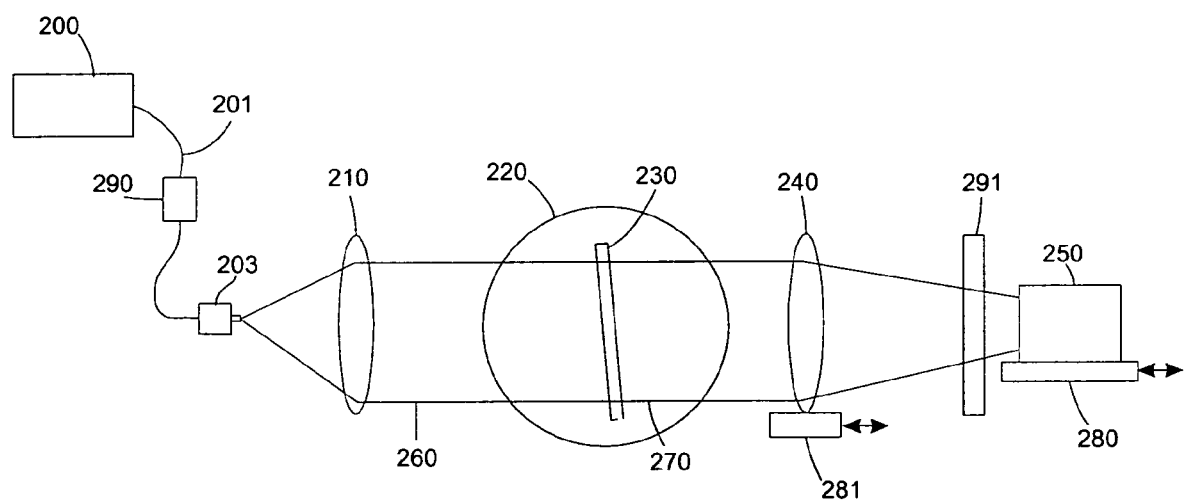
FIG. 2 shows the volume holographic grating wafer measurement system.

FIG. 2 is a schematic diagram of the wafer-level volume hologram measurement system of the invention. A source laser 200 with a fixed wavelength is fiber coupled to fiber 201 and is terminated with a fiber connector 203. The light output from the fiber is collimated with collimating lens 210. The collimated beam 260 passes through the wafer 230 being tested. The beam 270 transmitted through the wafer is imaged with lens 240 to the camera sensor 250 (e.g. 2D camera sensor). The wafer under test is mounted on a rotation stage 220 with a rotation axis that is approximately centered within the measurement beam 260. The spatial resolution of the system is limited only by the performance of the imaging lens 240 and the sensor array 250.

The fiber 201 in one embodiment is a single mode fiber so as to provide a single spatial mode measurement beam. It is not required that the source laser be fiber-coupled, but doing may make it easier to change the wavelength of operation of the system due to the repeatability of fiber connectors. In an alternative embodiment, multiple lasers are simultaneously connected to a fiber optic switch, which selects one of the lasers to be used as the source for any particular measurement. Each laser operates at a different wavelength in order to expand the range of operation of the measurement system. With a typical imaging system, the focus position will change slightly when the wavelength is changed. Either or both the lens and camera can be placed on translation stages 280, 281 to adjust their positions to bring the wafer back into focus after the wavelength is changed. Motorized translation stages may be used in one embodiment to automate the process.

In one embodiment, a variable attenuator may be used with the system to attenuate the source laser to reduce the possibility of overexposure of the sensor. The attenuator can be a fiber optic attenuator 290 that decreases the source power, or a free-space attenuator 291 located in front of the sensor 250. The attenuator can be either continuously variable or discretely variable.

Figure 3:
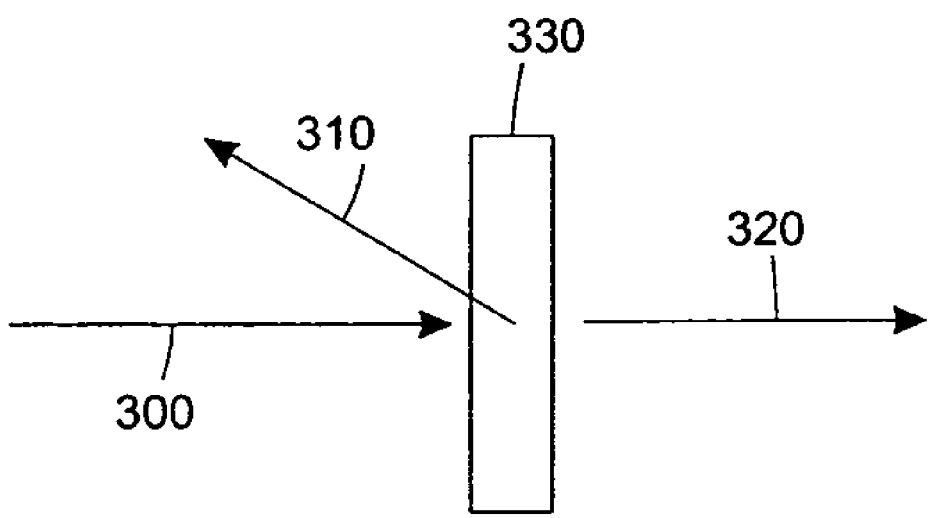
FIG. 3 is a detail view of volume holographic grating readout.

A diagram of diffraction from a volume holographic reflection grating is shown in FIG. 3. The measurement beam 300 is incident on the volume holographic reflection grating 330. A portion of beam 300 is diffracted into beam 310, and a portion of beam 300 is transmitted as beam 320 through the holographic material. The diffraction efficiency is at its maximum when the Bragg condition is satisfied, given by $\lambda_b = 2n\Lambda \cos(\phi - \theta_b)$ where $\lambda_b$ is the measurement wavelength, n is the refractive index of the grating element, $\Lambda$ is the grating spacing, $\phi$ is the grating tilt angle, and $\theta_b$ is the angle of incidence measured inside the media. In this system the laser wavelength is fixed and the angle of readout is varied to measure the Bragg-matching angle and the Bragg-matched diffraction efficiency.

Figure 5:
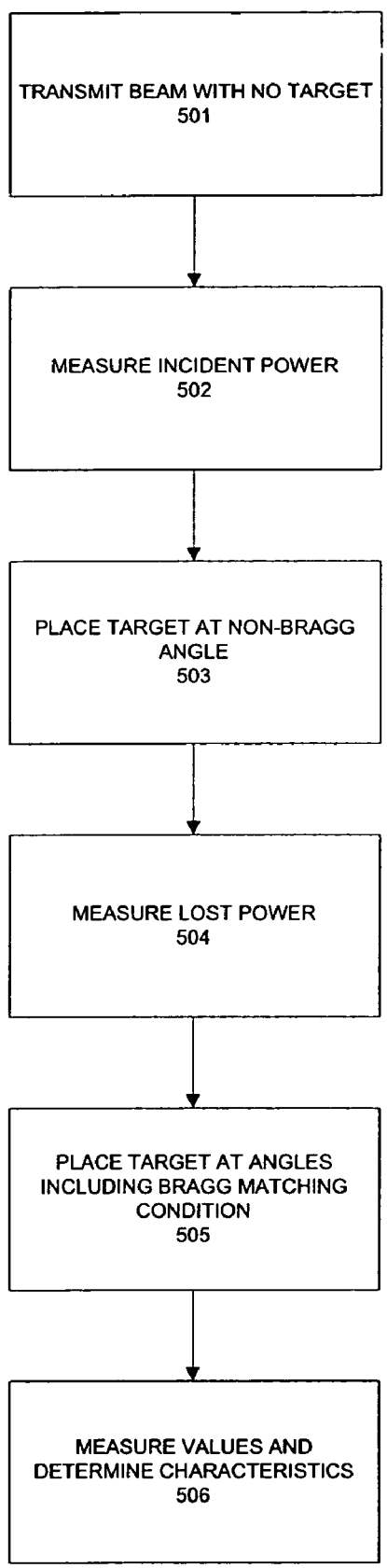
FIG. 5 is a flow diagram illustrating an embodiment of practicing the invention.

Due to energy conservation, the system must obey the equation $P_i = P_d + P_t + P_1$ where $P_i$ is the incident power, $P_d$ is the diffracted power, $P_t$ is the transmitted power, and $P_1$ is the power lost due to absorption and scattering. One embodiment of a method for practicing the invention is illustrated in the flow diagram of FIG. 5. Incident power $P_i$ is first directly measured without the wafer in place (steps 501 and 502). By inserting the wafer and placing it in a configuration that is far from the Bragg-matching condition (step 503), such as choosing a suitable angle relative to the measurement beam, the lost power can be measured (step 504). Under these conditions $P_d$ is zero, and with a measured value of $P_t$ the lost power is computed as $P_1 = P_i - P_t$. Once $P_i$ and $P_1$ are known $P_d$ is computed as $P_d = P_i - P_1 - P_t$ from a measurement of the transmitted power, $P_t$. The diffraction efficiency of the grating when Bragg-matched is calculated from the maximum diffracted power measured over a range of angles that includes the Bragg matching condition (step 505) and values and characteristics can be determined (step 506). In one embodiment, multiple measurements may be taken at one angle and averaged to reduce the effects of noise in the system.

With this system the grating spacing and slant angle can also be determined from the same measurement. If $\theta_{b1}$ and $\theta_{b2}$ are the two angles (inside the grating element) that satisfy the Bragg matching condition, then the slant angle is $\phi = (\theta_{b1} + \theta_{b2})/2$. The grating spacing is then $$\Lambda = \frac{\lambda_b \cos(\phi - \theta_{b1})}{2n}.$$

This system therefore provides the capability to measure a wide range of volume holographic gratings while using only a low-cost single wavelength laser as opposed to a more expensive tunable laser.

Figure 4:
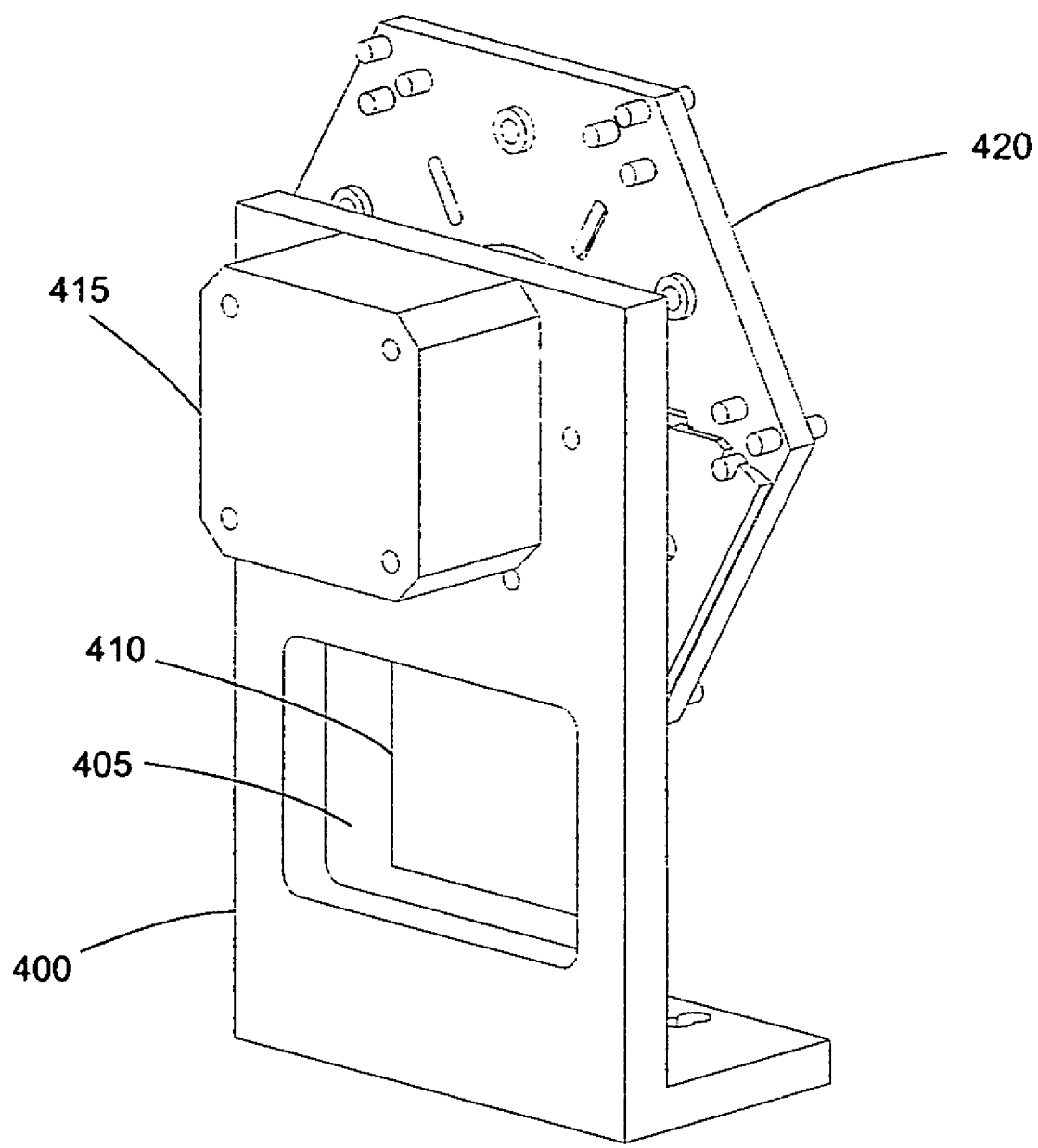
FIG. 4 shows a multi-wafer carousel mount.

As shown in FIG. 2, the wafer to be measured is placed on a rotation stage. This allows only one wafer to be measured at a time. Introducing a multiple wafer carousel, whereby the carousel places into the measurement beam a single wafer for measurement at any one time, can increase throughput. FIG. 4 is an illustration of a carousel 420 that has 6 wafer spaces. The mount 400 is attached to the rotation stage and has a window 405 through which the measurement beam passes. The illustration shows a wafer 410 when placed in the measurement beam path. After measurement of a wafer, the carousel can be rotated with a motor 415 to position a different wafer into the measurement beam path. If one of the 6 spaces is left empty, then that position can be used when measuring the incident beam power for the process described above. The carousel is not limited to six spaces, but alternative designs could use more or less, as required by the application.

The measurement data produced includes values for grating spacing, tilt angle, and diffraction efficiency with a high spatial resolution. This provides the information necessary for dicing a wafer into smaller components for which it would not be economical to measure individually as small components. The high-resolution data enables sorting and binning of parts according to their performance and part specifications.

Figure 6:
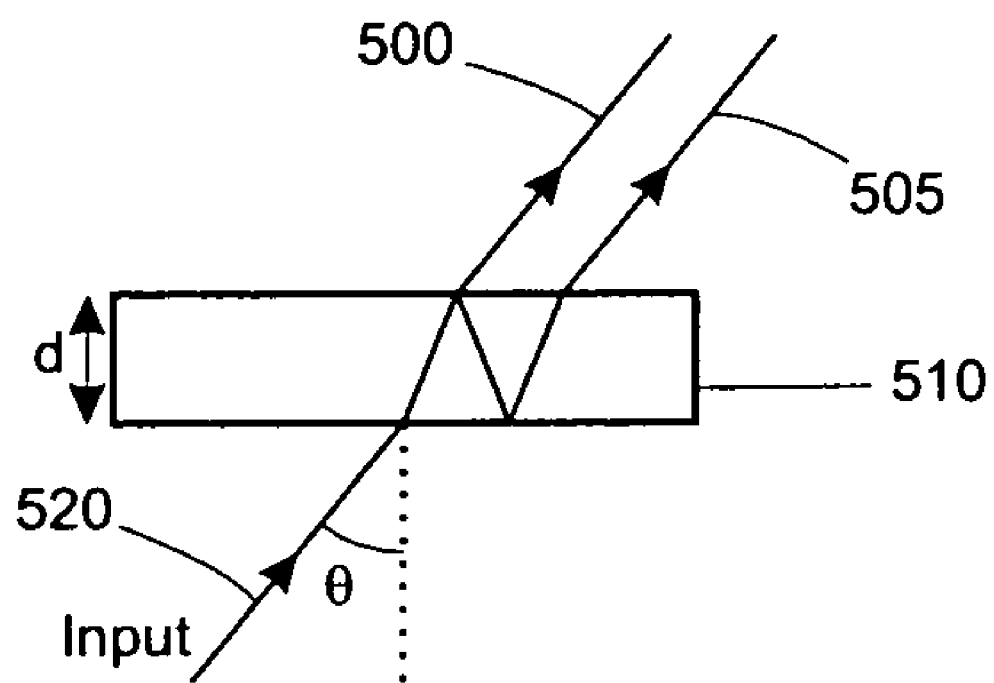
FIG. 6 illustrates the case considering the primary transmitted input and the first reflected beam in a parallel window.

For parts that are not anti-reflection coated there is interference between reflections from the two surfaces that should be taken into account in order to increase accuracy. The amplitude of the intensity modulation created by this interference generally approaches 8% depending on the refractive index. FIG. 6 illustrates the case considering the primary transmitted input 500 and the first reflected beam 505 in a parallel window 510. As the input angle varies the relative phases between the primary and first reflected beam changes, causing the transmitted intensity to be modulated according to the equations $$t(x, y, \theta) = t_0[1 + m\sin(\Delta\phi(\theta) + \phi_0(x, y))] \qquad \text{Equation 5}$$

$$t_0 = T(1 - R)^2(1 + (RT)^2) \qquad \text{Equation 6}$$

$$m = \frac{2RT}{(RT)^2 + 1} \qquad \text{Equation 7}$$

$$\Delta\phi = \frac{4\pi d}{\lambda}\sqrt{n^2 - \sin^2(\theta)} \qquad \text{Equation 8}$$

where $\theta$ is the input angle, x and y are positional coordinates, $t_0$ is the average transmission, R is the single surface reflectivity, T is the bulk transmission, m is the modulation degree, $\phi_0$ is a constant phase factor, and $\Delta\phi$ is the phase difference at a particular angle between the primary and first reflected beams.

The measurement data is used to determine $t_0$, m, and $\phi_0$ by numerically fitting equation 5 with them as free parameters. Using equations 6 and 7 it is then possible to compute R and T as $$T = \frac{p}{2} + \sqrt{\left(\frac{p}{2}\right)^2 - \gamma^2} \qquad \text{Equation 9}$$

$$R = \frac{\gamma}{T} \qquad \text{Equation 10}$$

$$\gamma = \frac{1 - \sqrt{1 - m^2}}{m} \qquad \text{Equation 11}$$

$$p = 2\gamma + \frac{t_0}{1 + \gamma^2} \qquad \text{Equation 12}$$

For small angle ranges the reflectivity can be assumed to be constant.

When measuring a volume holographic grating, the angle range is chosen well beyond the Bragg-angle in order to obtain data unaffected by the grating. The data in the area of the grating is the sum of the grating response and interference from the surface reflections. In the case of relatively weak gratings, below about 5 times the single surface reflectivity, it is difficult to obtain an accurate value for the grating's diffraction efficiency. By subtracting the fit function (Equation 5) from the measured data and normalizing by the incident power, the diffraction efficiency can be obtained.

Thus, methods and apparatus are described in conjunction with one or more specific embodiments. The invention is defined by the claims and their full scope of equivalents.

The invention claimed is:

1. A system for measuring the characteristics of a volume holographic grating comprising;
   a light source for generating an output beam;
   a stage for mounting the holographic grating such that the volume holographic grating can be disposed in the path of the output beam and producing a transmitted beam;
   a detector disposed in the path of the transmitted beam for receiving the transmitted beam and generating output values that are used to calculate characteristics of the volume holographic grating.

2. The system of claim 1 wherein the volume holographic grating is a wafer.

3. The system of claim 1 wherein the light source is a single wavelength light source.

4. The system of claim 3 wherein the single wavelength light source is a fiber coupled laser.

5. The system of claim 1 further including a collimator disposed between the light source and the volume holographic grating.

6. The system of claim 5 further including a lens disposed between the volume holographic grating and the detector.

7. The system of claim 1 wherein the detector is a 2D camera detector.

8. The system of claim 1 wherein the stage is rotatable to change the orientation of the volume holographic grating in the input beam.

9. The system of claim 1 wherein the characteristics of the volume holographic grating include diffraction efficiency, grating spacing, slant angle, and bulk transmission.

10. The system of claim 3 further including a plurality of fiber coupled lasers of different wavelengths.

11. The system of claim 10 further including fiber optic switches for selecting from the plurality of fiber coupled lasers.

12. The system of claim 11 further including focusing means for automatically modifying the focus of the system depending on the selection of one of the plurality of fiber coupled lasers.

13. The system of claim 1 further including means for removing the volume holographic grating to acquire reference measurements.

14. The system of claim 1 further including a variable attenuator to prevent overexposure of the sensor.

15. The system of claim 2 further including a carousel for holding a plurality of wafers that can be selectably placed in the path of the output beam.

16. A method of determining characteristics of a volume holographic grating comprising:
    transmitting a light beam to a detector and measuring incident power;
    placing the volume holographic grating in a position at a non-Bragg angle on a stage in the path of the light beam and between the light beam and the detector and measuring lost power;
    placing the volume holographic grating at a number of angles including a Bragg matching condition;
    measuring values of the light transmitted through the volume holographic grating onto the target and calculating characteristics of the volume holographic grating.

17. The method of claim 16 further including fitting and subtracting interference due to surface reflections.

* * * * *